Patented Feb. 6, 1945

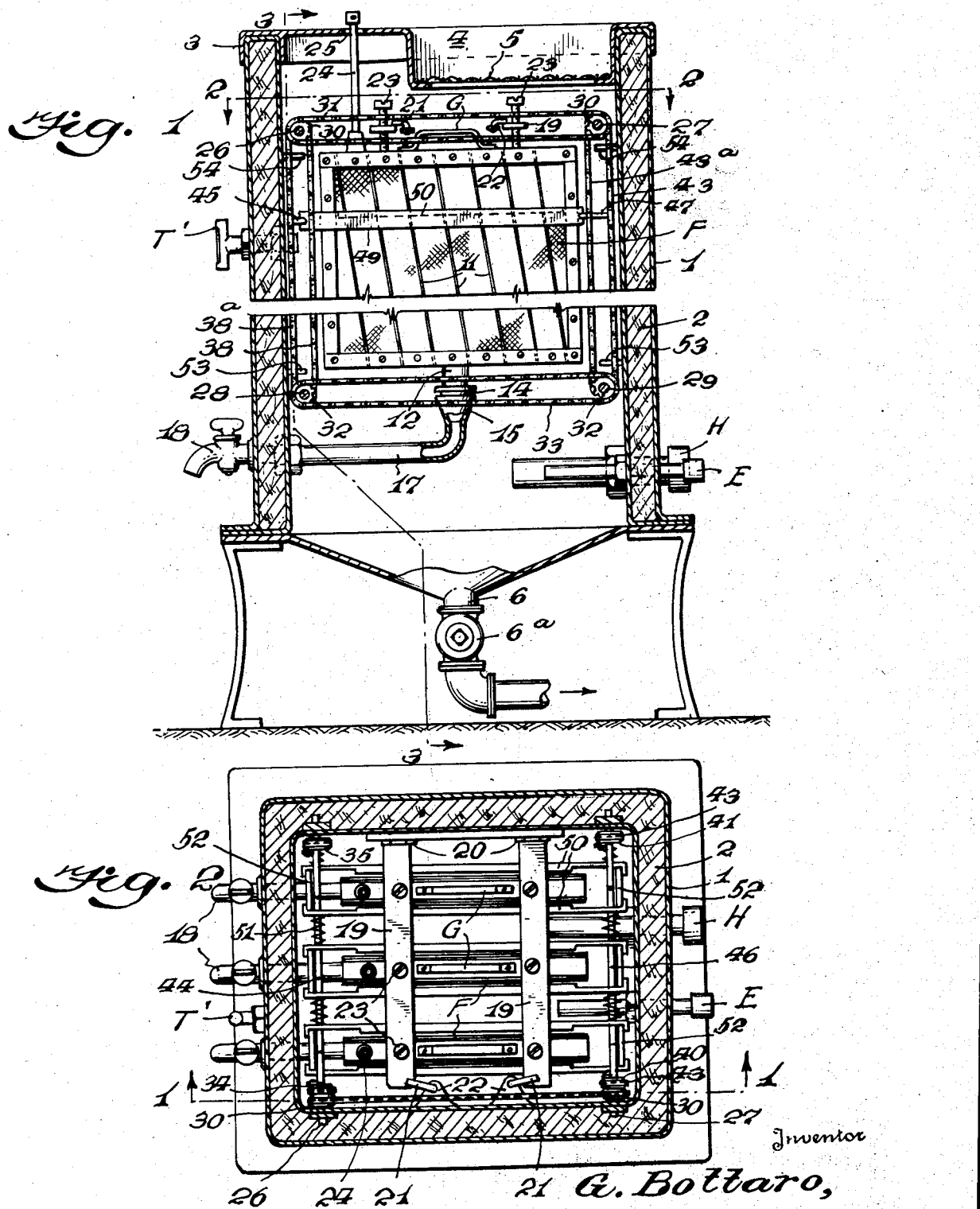

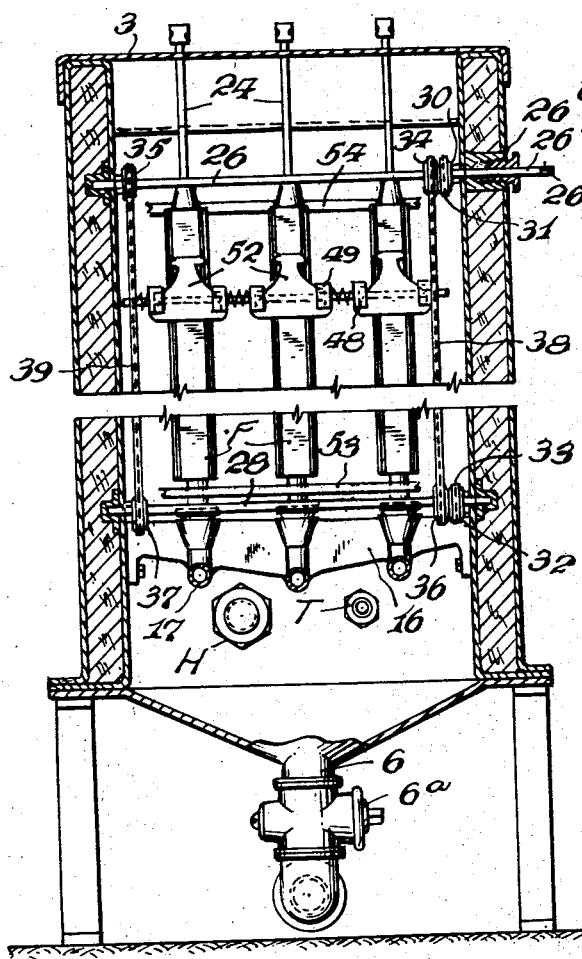
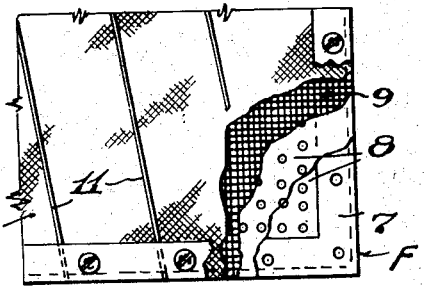
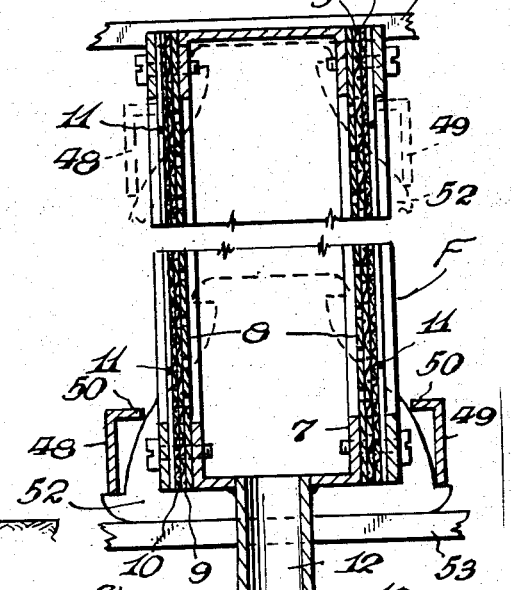
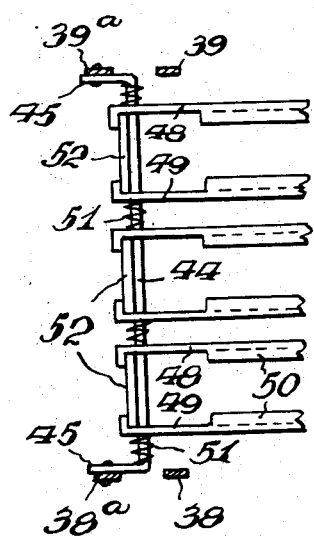
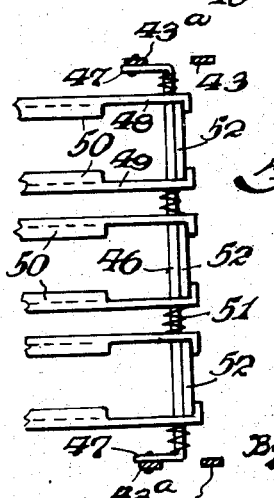

2,368,636

UNITED STATES PATENT OFFICE 2,368,636

APPARATUS FOR RECLAIMING OF USED LUBRICATING OILS

Giacomo Bottaro, Genoa, Italy; vested in the Alien Property Custodian

Application February 23, 1938, Serial No. 192,177
In Italy March 1, 1937

2 Claims. (Cl. 210—182)

This invention refers to an apparatus for a sweating process for used oils. For this purpose the used oil is put into a device which contains filtering elements, the porous surfaces of which possess the property of adsorbing and retaining firmly thereon the semi-solid oxidation products, the so-called "asphalts." The coating which forms on the surfaces adheres so closely to them that it cannot be removed by mechanical means. In this way an actual compound is formed between the "asphalts" and the surfaces of the porous walls which forms a diaphragm which functions as a skin, so that the oil is first absorbed by said diaphragm and then passes through the porous walls. All impurities such as colloidal coal, dust and other quantities of asphalt are caught by the asphalt-porous-surface-diaphragm which adsorbs also substances which are dissolved colloidally in the oil.

In the annexed drawings, one embodiment of the invention is illustrated only by way of example.

In the drawings:

Fig. 1 is a vertical section on the line 1—1 of Fig. 2.

Fig. 2 is a horizontal section on the line 2—2 of Fig. 1.

Fig. 3 is a vertical section on the line 3—3 of Fig. 1.

Fig. 4 is an enlarged fragmentary detail of one of the filtering elements, portions being broken away.

Fig. 5 is an enlarged vertical transverse section of one of the elements.

Fig. 6 is an enlarged plan view of the scrapers.

As illustrated in the drawings, the device has a tank 1 insulated by a layer 2 of suitable material, a removable cover 3 with a depressed receptacle 4 with a perforated bottom 5. In the bottom of the tank 1, there is a discharge pipe 6 with a cock 6—a. The tank 1 contains a plurality of removable filtering elements F, three being shown for illustration in the drawings (Figs. 2 and 3). Each element F has a rectangular, equilateral frame 7, on each of the two opposite flat faces of which are suitably superposed a perforated plate 8, a metal net 9 and a layer of porous material 10 (Figs. 4 and 5). Wires 11 are suitably mounted on the outer surfaces of the material 10. It will be noted (Figs. 1 and 4) that these wires 11 are inclined from the perpendicular. Each element F is provided in its bottom with a discharge pipe 12 having a peripheral shoulder 13 and a frusto-conical end portion 14 (Fig. 5). Sockets 15 adapted to receive therein the portions 14 are formed in a beam 16 bridging the lower part of tank 1. Each socket 15 has depending therefrom a discharge pipe 17 which passes through a packed joint in the wall of tank 1 and is provided exteriorly of the tank 1 with a cock 18, so that each element F is provided with a draw-off means. Each element F has a grip G at its upper edge (Fig. 1) for placing the element in tank 1 and removing it therefrom. Retainer straps 19 are suitably mounted by hinges 20 on one inner wall of the tank 1 and fastened by latches 21 pivoted on ears 22 on the opposite inner wall of tank 1. Binding screws 23 are threaded through the straps 19 to adjustably secure the elements F in proper positions in the tank 1. Each element F has an air vent 24 passing through a hole 25 in the cover 3 of tank 1. The tank 1 has a suitable heating element H controlled by a thermostat E, and also has a thermometer T'.

Suitably journaled in the upper part of the tank 1 are the shafts 26 and 27, and, in the lower part, the shafts 28 and 29 (Fig. 1). On the corresponding ends of shafts 26 and 27 are mounted sprockets 30, respectively, connected by a horizontal sprocket chain 31, and on corresponding ends of shafts 28 and 29 are mounted sprockets 32 connected by a horizontal sprocket chain 33. Shaft 26 has an extension 26—a (Fig. 3) passed through a packed joint 26—b in the wall of tank 1, and having a squared end 26—c for the application of a crank (not shown) for rotating shaft 26. Shaft 26 has a sprocket 34 mounted on one end adjacent sprocket 30, and, on its opposite end, a sprocket 35. Shaft 28, below shaft 26, has sprockets 36 and 37 corresponding and aligned with sprockets 34 and 35 respectively. Sprockets 34 and 36 are connected by a vertical sprocket chain 38, and sprockets 35 and 37 by a vertical sprocket chain 39 (Fig. 3). In the same way, shaft 27 has sprockets 40 and 41 (Fig. 2), and shaft 29 has corresponding sprockets (not shown). Sprockets 40 and 41 are connected by vertical sprocket chains 43 with their corresponding sprockets on shaft 29 (Fig. 1). The above described sprockets and sprocket chains (34—43) are so disposed and related that a vertically movable sprocket chain (38, 39, 43, 43) is provided at each corner of the tank 1 (Fig. 2), and that rotation of shaft 26 by the crank will rotate shafts 27, 28 and 29, and cause the sprocket chains 38, 39 and 43 to travel.

A horizontal rod 44 is attached by means of ears 45 on its ends to sprocket chains 38 and 39, and a horizontal rod 46 by means of ears 47 to sprocket chains 43. It will be noted (Figs. 2 and 6) that the rod 44 is attached to the run 38—a of chain 38, and run 39—a of chain 39, and that rod 46 is attached to runs 43—a of chains 43, so that the vertical movements of the rods 44 and 46 will correspond. The above described mounting of rods 44 and 46 disposes them transversely and on opposite ends of the members F (Figs. 2 and 3). Slidably mounted on rods 44 and 46 are bars 48 and 49, arranged in pairs so that a bar of each pair is adjacent one side of each element F (Fig. 2). Each bar is provided on its face adjacent element F with a scraper 50 designed and disposed to bear against the wires 11 on the outer faces of the elements F (Fig. 1). Coil springs 51 are provided on the rods 44 and 46, interposed between ears 45, 47 and rods 48 and 49 (Fig. 6) urging bars 48 and 49 together, to cause the scrapers 50 to press against the wires 11. A wedge 52 is slidably received between the ends of the bars 48 and 49 of each pair (Fig. 3). These wedges 52 are so designed and disposed that when they are depressed the bars 48 and 49 approach one another under the influence of springs 51, and when they are elevated the bars 48 and 49 are separated against the influence of springs 51. Abutments 53, mounted in the lower part of the tank 1, and abutments 54 in the upper part are located in the path of travel of the wedges 52, and are adapted to elevate and depress the wedges 52, respectively.

From the foregoing description of the details of construction of the device, its use and operation will appear. The used oil is fed into the receptacle 4, the coarser impurities being retained on its bottom 5 and the oil with its finer impurities flowing downwardly into the tank 1. The elements F, having been positioned in tank 1 before the oil is introduced, are then surrounded by the oil which comes into contact with the porous material 10 forming the outer surface of each side of each of the elements F. The oil, passing through the porous material 10 is filtered thereby and enters the elements F purified, and can be discharged therefrom through the pipes 17. The impurities separated from the oil, retained on the material 10, accumulate to form a deposited layer through which the oil must pass to enter the elements F. When this layer has been built up to such an extent that it exceeds the proper thickness, the excess portion of the layer can be removed by the scrapers 50 and their operating mechanism.

When the bars 48 and 49, on which the scrapers 50 are provided, are moved downwardly by use of the crank on the end 26—c of shaft 26, until the bottoms of the wedges 52 bear against the abutments 53, the bars 48 and 49 continuing to move downwardly, the wedges 52 are elevated relatively to bars 48 and 49, causing them to separate as indicated in the lower portion of Fig. 5, and thereby moving the scrapers 50 away from the wires 11 on the material 10 of each face of each of the elements F. The bars 48 and 49 then move upwardly, the scrapers 50 passing the faces of the sides of elements F, spaced therefrom and completely out of contact with the layers of impurities deposited thereon, until the tops of wedges 52 bear against the abutments 54, the bars 48 and 49 continuing to move upwardly, the wedges 52 are depressed relatively to the bars 48 and 49, causing them to approach one another, as indicated in dotted lines in the upper portion of Fig. 5, under the influence of springs 51 so that the scrapers 50 are pressed tightly against the wires 11 on the surfaces of the porous material 10 on each face of each of the elements F. When the bars 48 and 49 are moved downwardly, the scrapers 50 travelling over the faces of the elements F remove that portion of each layer of impurities which extends from the surface of the material 10 beyond the wires 11. This excess falls to the bottom of the tank 1 and can be removed therefrom through pipe 6. Thus it is obvious that by use of the scrapers 50 the layers on the material 10 can be maintained at the desired thickness determined by the diameter of the wires 11, and that by reason of the inclination of wires 11 from the perpendicular, the edges of the scrapers 50 do not become serrated by wear from the wires 11, and thereby any variation of the thickness of the layer is prevented.

It is obvious that each element F can be removed from tank 1 by releasing straps 19 and lifting the element F by grip G.

What is claimed is:

1. A device for separating impurities from used lubricating oil comprising a container, at least one plate-like filtering element disposed vertically within said container, each filtering element comprising two spaced perforated plates, a metal net disposed outside of each plate, a layer of porous material outside of each net, means communicating with the space between the perforated plates for removing clean oil, means for admitting used oil into the container to surround each of the filtering elements, scraper means for removing excess impurities from the outer surface of the filtering element, means for reciprocating said scraper means over said surface, means for adjusting said scraper means alternately into and out of operative position in relation to said surface, and means for actuating said adjusting means, said actuating means operating when the scraper means reaches the end of each stroke of reciprocation.

2. A device for separating impurities from used lubricating oil comprising a container, at least one plate-like filtering element disposed vertically within said container, each filtering element comprising two spaced perforated plates, a metal net disposed outside of each plate, a layer of porous material outside of each net, means communicating with the space between the perforated plates for removing clean oil, means for admitting used oil into the container to surround each of the filtering elements, scraper means for removing excess impurities from the outer surface of the filtering element, means for moving said scraper means upwardly and downwardly over said surface, means for adjusting said scraper means into operative position when moving downwardly and into inoperative position when moving upwardly, and means for actuating said adjusting means, said actuating means operating when the scraper means reaches the limits of its upward and downward movement.

GIACOMO BOTTARO.